United States Patent
Jones

(10) Patent No.: US 10,349,576 B1
(45) Date of Patent: Jul. 16, 2019

(54) VEGETATION CUTTER AND MULCHER

(71) Applicant: Charles M Jones, Woodridge, IL (US)

(72) Inventor: Charles M Jones, Woodridge, IL (US)

( * ) Notice: Subject to any disclaimer, the term of this patent is extended or adjusted under 35 U.S.C. 154(b) by 0 days.

(21) Appl. No.: 15/902,215

(22) Filed: Feb. 22, 2018

(51) Int. Cl.
*A01D 34/416* (2006.01)
*A01D 34/66* (2006.01)
*A01D 34/73* (2006.01)
*A01D 34/00* (2006.01)
*A01D 101/00* (2006.01)

(52) U.S. Cl.
CPC .......... *A01D 34/005* (2013.01); *A01D 34/66* (2013.01); *A01D 34/733* (2013.01); *A01D 34/416* (2013.01); *A01D 34/661* (2013.01); *A01D 2101/00* (2013.01)

(58) Field of Classification Search
CPC .... A01D 34/005; A01D 34/733; A01D 34/66; A01D 34/416; A01D 42/005
See application file for complete search history.

(56) References Cited

U.S. PATENT DOCUMENTS

| | | | | |
|---|---|---|---|---|
| 2,956,386 A | * | 10/1960 | Niemann | A01D 34/005 56/13.8 |
| 3,129,549 A | * | 4/1964 | Stauffer | A01D 34/005 56/14.7 |
| RE29,139 E | * | 2/1977 | Messner | A01D 42/00 15/328 |
| 4,057,952 A | | 11/1977 | Brokaw | |
| 4,135,351 A | | 1/1979 | Akgulian | |
| 4,351,144 A | * | 9/1982 | Benenati | A01D 34/005 56/295 |
| 4,464,886 A | | 8/1984 | Carter | |
| 5,191,756 A | | 3/1993 | Kuhn | |
| 5,199,251 A | | 4/1993 | Rouse et al. | |
| 5,261,217 A | | 11/1993 | Allen | |
| 5,269,127 A | | 12/1993 | Miles, Jr. | |
| 5,321,940 A | | 6/1994 | Peterson | |
| 5,375,400 A | | 12/1994 | Darden | |
| 5,398,490 A | | 3/1995 | Allen | |
| 5,669,213 A | * | 9/1997 | Britton | A01D 34/005 56/17.5 |
| 5,809,765 A | * | 9/1998 | Hastings | A01D 34/005 56/255 |
| 5,921,072 A | | 7/1999 | Cargile | |
| 5,960,619 A | | 10/1999 | Seidel et al. | |
| 6,062,013 A | | 5/2000 | Wolske | |
| 6,595,442 B1 | | 7/2003 | Green et al. | |
| 6,910,324 B2 | | 6/2005 | Kakuk | |
| 7,171,798 B1 | | 2/2007 | Bernardy | |
| 7,392,643 B2 | | 7/2008 | Warashina et al. | |
| 7,930,873 B2 | | 4/2011 | Darden | |

FOREIGN PATENT DOCUMENTS

JP    2003180118 A  *  7/2003

* cited by examiner

*Primary Examiner* — Daniel J Colilla

(57) ABSTRACT

The present invention is a device for cutting and mulching vegetation into consistently small uniform pieces by using a number of cutter cords that rotate in a circular plane of rotation with decreasing diameters as the position of the cutting wire is further from the power means. This design causes the grass to be sequentially cut into small confetti like pieces as the mowing machine moves forward.

4 Claims, 12 Drawing Sheets

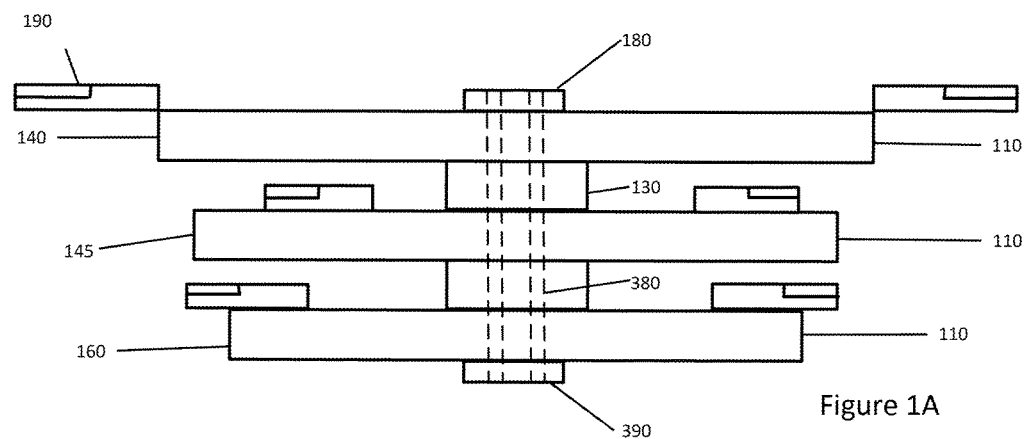
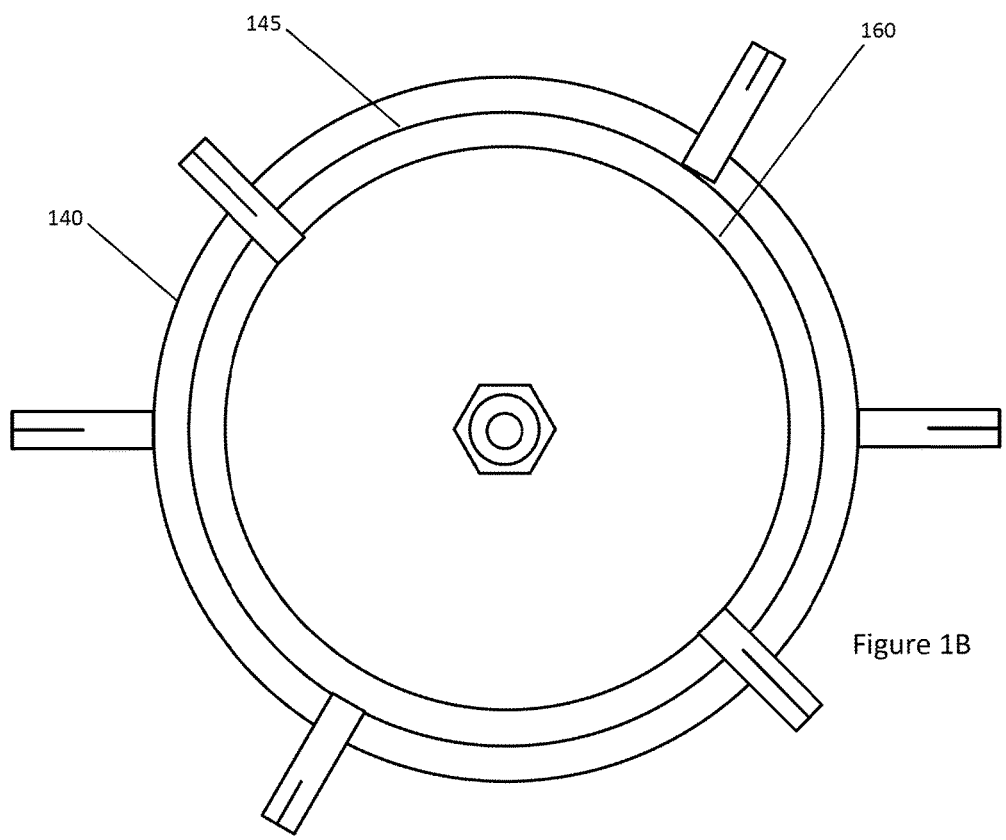

VEGETATION CUTTER AND MULCHER

BACKGROUND

Grass is a very popular ground cover in many countries. It is typically trimmed in order to have a well maintained look. To accomplish that goal, lawn mowers were invented. Instead of leaving the cut grass on the lawn, grass catchers were then invented to collect the cut grass. This brought about a new problem, where to put the cut grass. One could either dump it on a remote section of the property or haul it away. Then, as lawn maintenance equipment evolved, someone realized that if one mulches the cut grass and spreads it on the lawn there are some side benefits. Those benefits include retaining moisture for the grass, retarding the growth of weeds and not having to dispose of the cut grass. To accomplish the mulching goal, a number of designs emerged. The basic concept in these designs was to cut the grass as before, but instead of collecting it outside the mower, they tried to have the blades create turbulence causing the cut chunks to tumble around the whirling blades with the hope that they would then be randomly cut into very small confetti like pieces. The problem is that, as in any random process, the cut lengths would be of random lengths, some would be long and some short. Unfortunately the longer pieces do not fall between the remaining grass stalks but lie on top of them. This would then detract from the well manicured look of the mowed lawn. In addition to that problem, different blade designs worked differently under different conditions. For example, wet grass cuts differently than dry grass. This is the current state of the art.

PRIOR ART

The current state of the art in grass mulching involves apparatuses that typically have a single blade, or multiple blades with the same diameter of rotation, that cuts a chunk of the grass off and directs it upward to be hit again with the spinning blades for randomly re-cutting into shorter pieces. This approach assumes that the final pieces will all be small before falling to the ground. One problem is that the final pieces are random lengths, some large and some small. The large ones are the problem since they do not fall between the remaining grass stalks, but lay on top of the lawn.

A second concept of causing the cut grass to end up in small pieces was also introduced in the prior art. The concept involves forcing the grass toppings through a screen assuming that the pieces that get through the screen will all be small before falling to the ground. One problem found with this design is that the screen tends to get clogged and requires repeated cleaning although one example included a brushing action to keep that from happening.

A third concept emerged in the prior art. This third concept did not involve a rotating cutting blade but did involve a series of many blades scraping by each other causing a scissor like action to cut the grass. This appears to be very complicated and difficult to keep the scissor blades sharpened. It also produced random length cuttings.

A fourth concept came from Okita patent (JP2003-180118) It refers to two planes of rotation as two stages with the lower stage having a shorter diameter than the upper stage. His design achieves this by bending the blade holders so that there are two planes of rotation. There are two points that show that Okita did not anticipate more than two stages or planes of rotation. The first point is in his detailed description "However, there was a problem that weight will increase so much if a cutting edge is increased, and the load concerning a driving shaft and a motor will increase . . . . Additional rotating blades would add weight and load on the motor. Cutting to two steps of upper and lower sides . . . ". The second point is, as his drawings show, that there is insufficient room for a third (or more) blade holder inside his mower housing.

There is no claim by any prior art to use four or more uniformly decreasing flexible cutting blade diameters of rotation to consistently cause uniform, confetti like pieces of mulched grass to be produced as the present invention does.

SUMMARY OF THE PRESENT INVENTION

The present invention is a device for cutting and mulching vegetation (i.e. grass) into consistently small uniform, confetti like, pieces by using a number of cutter cords, such as those found on conventional grass trimmers, as one example. The cutter cords, in the present invention are of different lengths causing different diameters of rotation. The present invention arranges the cords with the longest cord closest to the power means and the others with progressively decreasing lengths as they get closer to the ground. The forward movement of the mowing machine then causes the top pieces of the grass stalks to be cut off first by the longest cutting cord and then the next piece cut by the second longest cord and so on.

This is desirable because the small cut pieces will fall between the remaining cut stalks and serve to retain moisture and also to retard the growth of weeds in the growing medium. It also eliminates the problem of disposing of the cuttings. The device is a multiple cutter cord configuration that can be used with a powered mowing machine (hand pushed, driven or robotic) having a vertical drive shaft. Hubs, holding the cutter cords, are attached to a tube and the tube is attached to the vertical drive shaft. The cutter cords may be easily replaced. The length of the cutting cords forming the diameters of the circular planes formed by the locus of the rotating hubs and cutter cords are progressively shorter as they get closer to the growing medium. This arrangement of the hubs and cutter cords causes the grass to be cut into uniform confetti like pieces as the mowing machine moves forward.

To visualize the present invention, imagine a lawn mower with a single cutter cord rotating in a circular plane parallel to the ground. As the rotating circular plane, adjusted to the proper height, passes through uncut grass, it would slice a single piece of grass from every blade of grass in its path leaving grass stalks at length "h". If the operator then lowered the cutting cord rotating circular plane a distance "d" and passed through same path, it would cut a second single piece of grass, of length "d", from every remaining stalk of grass in its path leaving grass stalks now at length "h-d".

If one continued this process then all cut pieces would achieve the goal of all small confetti like pieces of length "d". However one would have to do a number of passes to accomplish that goal. One might conclude that if you added a number of identical rotating circular planes a distance "d" from each other that it would cut pieces of consistent lengths "d". Unfortunately this is not true because the lower cutting cords would typically cut the stalks before the higher cutting cords as the rotating cutting cords caused the grass stalks to bend away from the cutting cords. The result would be even worse than the random length cut lengths, as in the prior art. The present invention is the non-obvious solution to this problem which is to design the cutting cords with sequentially decreasing diameters of rotation. This would then cause the longest cutting cords to cut the top piece of grass first as the lawn mower moves forward, then cut subsequent pieces, of length "d" with shorter length next, and so on, resulting in all cut pieces to be of consistent length "d" which an improvement over the prior art.

The length of the cut pieces is determined by the spacing between the planes of rotation of the cutting cords.

The desired spacing between the planes of rotation can be achieved by constructing the hubs to have a thickness, as measured on a line parallel to the drive shaft, approximately equal to the desired cut lengths of the grass. Alternatively, the hub thickness could be less than the desired cut lengths of the grass and spacers, or washers, could then be used to vary the desired cut lengths of the grass. There is one cutting cord per hub. The cord should extend an equal distance on each side of the hub. However, an assembly e with the cord extending out only one side of the hub will work also.

Another non-obvious benefit to the present invention is its ability to cut wet grass. It is an improvement over the prior art because it does not depend on the severed sections of grass to tumble around in the cutting chamber and be cut in random lengths. Wet grass tends to clump together which makes the tumbling problematic. The present invention cuts each small piece from the top of the stalk while the growing medium is holding the other end of the stalk of grass.

Lexicon of Terms and Abbreviations

Blade Holder (BH) The mechanism can have various shapes including, but not limited to, a saucer like disk, a bar, a rod or a cord. The BH can also be rigid or flexible. The blade holders have a hub for mounting on the tube.

Confetti like pieces—Small consistent length pieces of the grass, or other vegetation, that have been cut from the original stalks of vegetation.

Cutting Cord—A flexible or semi-flexible or semi-rigid component of the device capable of cutting, or slicing, a piece of grass from the top of a stalk of grass as it is rotated at a high rate of speed through a grass lawn.

Diameter of Rotation—The distance across the circular plane formed by the locus of the hubs and cutting cords-when rotating.

Vertical drive shaft—An arbor, typically an integral part of the power means, typically mounted in a vertical position First Fastening Means—A method of attaching the blade holders to the tube. Some possible means are: bolted, welded, pined, keyed, screwed or pressed or some combination of these means Grass—grass or other vegetation growing in a medium Growing Medium—The soil from which stalks of grass or other vegetation grows Hub—A mechanism for connecting the cutting cord to the tube Locus of the rotating cutter cords—the circular plane formed by the rotating Cutting cords Mowing Machine—a device for mowing grass consisting of a Frame, Wheels, Power Means and a cutting device Power Means—A device to cause the drive shaft to rotate. The device could be an electric motor or a gasoline engine or an engine powered by some other source of energy.

Rake Tong—a flexible wire tine or spring steel tine attached to bottom outside edge of the smallest blade holder for stirring up loose debris such as leaves for mulching by the cutting blades Remaining stalks—the length of grass that is left after one or more pieces have been cut from the top of the grass stalks Stalk—A length of a stem of grass in a growing medium Tube—a hollow cylindrical component of the device for holding the hubs and for mounting on the vertical drive shaft Tube Fastening Means—A method of attaching the tube to the drive shaft.

Wheel—Wheels for rolling a mowing machine over the growing medium

BRIEF DESCRIPTION OF THE DRAWINGS

FIG. 1 describes the blade holders (BH) as circular, saucer like, disks.

Figure 2A:
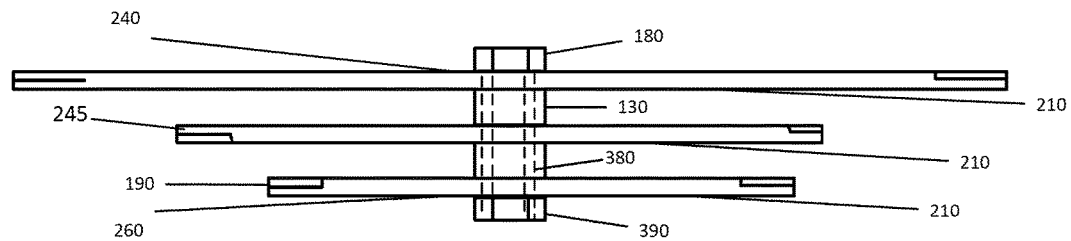
FIG. 2 describes the BH as a rod shaped bar, similar to conventional grass mower blades.

REFERENCE NUMERALS 110 a circular, saucer like, blade holder (BH)
120 vertical drive shaft
130 blade holder hub
140 the largest diameter BH (disk shaped)
145 an interior BH (disk shaped)
150 the power means to rotate the drive shaft
160 the smallest diameter BH (disk shaped)
190 cutting blade
210 bar shaped BH
240 the longest BH (bar shaped)
245 an interior BH (bar shaped)
260 the shortest BH (bar shaped)
270 the locus of the rotating cutting blades
280 the diameter of rotation of the cutting blades
350 the hole in the hub for the cutting cord to pass through
360 a groove on the bottom surface of the hub to hold the cutting cord compressed against the adjacent hub or screw nut
370 a hub
380 the tube
385 a flange on the proximal end of the tube
390 the screw nut to hold the hubs on the tube 410 vertical stalks of grass, or other vegetation
420 the growing medium that holds the roots of the grass or other vegetation
430 the top piece of the stalk of grass that is sliced off first with the cutting cords
440 the second piece of the stalk of grass that is sliced off with the cutting cords
450 the third piece of the stalk of grass that is sliced off with the cutting cords
455 the fourth piece of the stalk that is sliced off with the cutting cord
460 the largest cutting cord
470 an interim cutting cord
480 an interim cutting cord
490 the smallest cutting cord
500 mowing machine
510 a manual lawn mower
515 the vertical drive shaft
520 a human controlling the manual lawn mower
530 lawn mower housing
540 wheel
610 a riding lawn mower
620 a human controlling the riding lawn mower
710 a robotic lawn mower system
720 a remote control transmitter for the robotic lawn mower system
730 a robotic lawn mower
810 adjust the height of the largest diameter of rotation
820 check length of remaining stalk
830 readjust the height of the present invention
840 mow the grass
860 the distance, h1, between the largest diameter of rotation and the smallest diameter of rotation
870 the distance, h2 from the smallest diameter of rotation to the growing medium
880 the distance, d1, between each diameter of rotation
890 the length, hg, of the longest stem of grass to be cut
900 rake tong

DETAILED DESCRIPTION OF THE PRESENT INVENTION ROTATION

Referring now in greater detail to the drawings in which numerals indicate like parts through several views, the present invention refers to a device and method for using the device for cutting and mulching grass and other vegetation into consistently small uniform, confetti like, pieces 430, 440, 450, 455.

FIGS. 1 A & B describes the BH as circular, saucer like, disks 110. FIGS. 2 A & B describes the BH as a rod shaped bar, similar to conventional grass mower blades. FIGS. 3 A & B describes the BH as a cord holder with the cords 460, 470, 480, 490 acting as cutting blades, each one similar to the string in conventional string grass trimmers as an example.

FIGS. 1 A & B is a side and bottom view sketch of embodiment 1 of the device with three (as an example) disk shaped blade holders 110 mounted on a tube 390 with threaded ends. The BH are held in place by the tube fastening means shown here as screw nuts 390 on each end of the tube that tightens the BH into a desired position on the tube. The cutting blades 190 are mounted on the circumference of the BH (140, 145, 160) in a balanced configuration.

FIG. 1 shows two cutting blades 190 mounted on opposite edges of each blade holder. However, additional cutting blades could be mounted in this embodiment as long as their placement is balanced around the circumference of the blade holder. In this sketch, one example of the tube fastening means, the screw nuts 390 with mating threads are tightened on the threaded tube to hold the blade holders tight in the desired position as determined by the thickness of the blade holders hub 130. The largest diameter blade holder 140 is mounted on one end of the tube. The remaining BHs 145 are of proportional decreasing diameters as the mounting position proceeds from the largest diameter BH to the smallest diameter BH 160.

The thickness of the blade holder hubs can be less than the predetermined length of the cut pieces of grass allowing spacers to be used to vary the predetermined length of the cut pieces of grass.

Figure 2B:
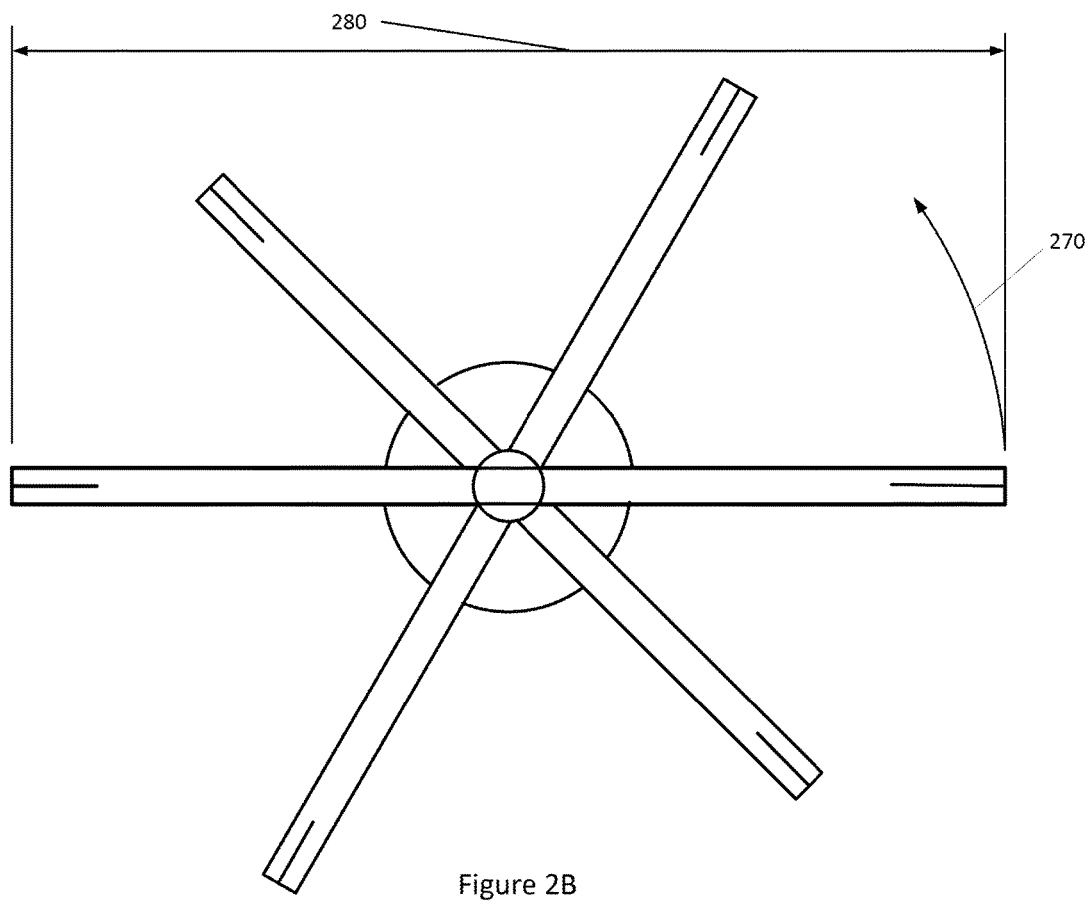

FIGS. 2 A & B is a side and bottom view sketch of embodiment 2 of the device with three (as an example) rod (rectangular cross-section) shaped blade holders 210. A single rod is similar to conventional grass mower blades with the cutting blades 190 mounted on opposite ends of the bar. Alternatively the bar ends may be sharpened into cutting blades similar to many current designs. In this sketch, an example of the first fastening means, screw nuts 390 with mating threads are tightened on the threaded tube to hold the blade holders tight in the desired position as determined by the thickness of the blade holders hub 130 plus any required spacers. The longest BH 240 is mounted on one end of the tube 380 and the shortest BH 260 is mounted on the opposite end of the tube. The remaining BHs 245 are of proportional decreasing length as the mounting position proceeds from the longest BH to the shortest BH. The locus 270 of the rotating cutting blade defines the circumference of a circle with a diameter of rotation 280. The cutting blades 190 are mounted on the ends of the BH 240, 245, 260 in FIG. 2A.

Figure 3A:
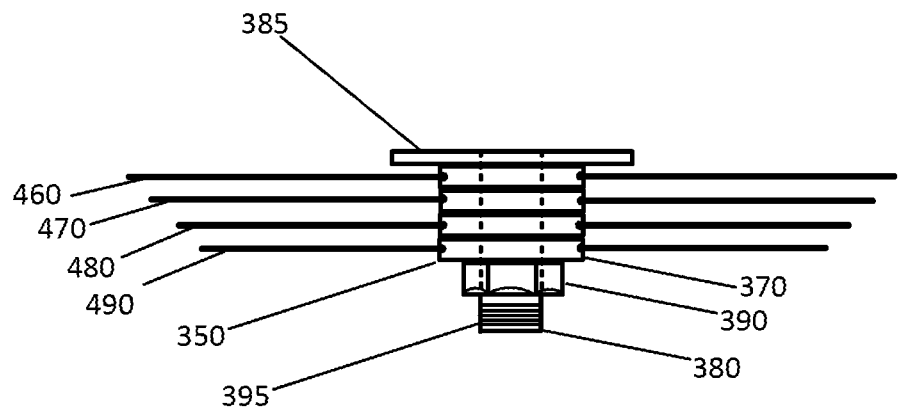
FIG. 3 describes the BH as a cord holder with the cords acting as cutting blades, each one similar to the string in conventional string grass trimmers, as an example.
Figure 3B:
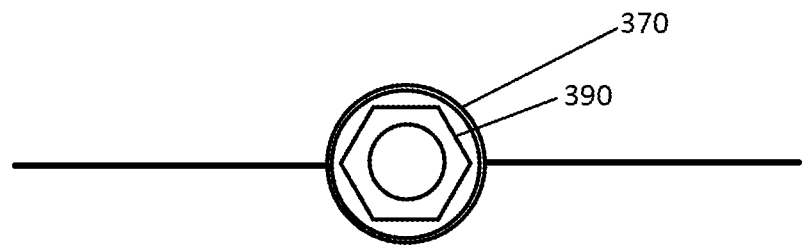

The assembly of tube 380, hubs 370, cutting cords 460, 470, 480, 490 and a screw nut 390 is shown in FIG. 3A as a side view and in FIG. 3B as a bottom view.

The cutting cords are locked into the hubs when the screw nut is tightened against the hubs. The length of the cutting cords are longest 460 closest to the flange 385 on the end of the tube and smallest 490 on the opposite end of the tube with proportionally decreasing length cutting cords between the longest and shortest cutting cord A threaded screw nut 390 with mating threads are tightened on the threaded tube 380 to hold the hubs in the desired.

FIG. 3B is a bottom view of the device. The cutting cords are shown parallel to each other, however they could be offset from each other (i.e. a 45 degrees offset).

Figure 4:
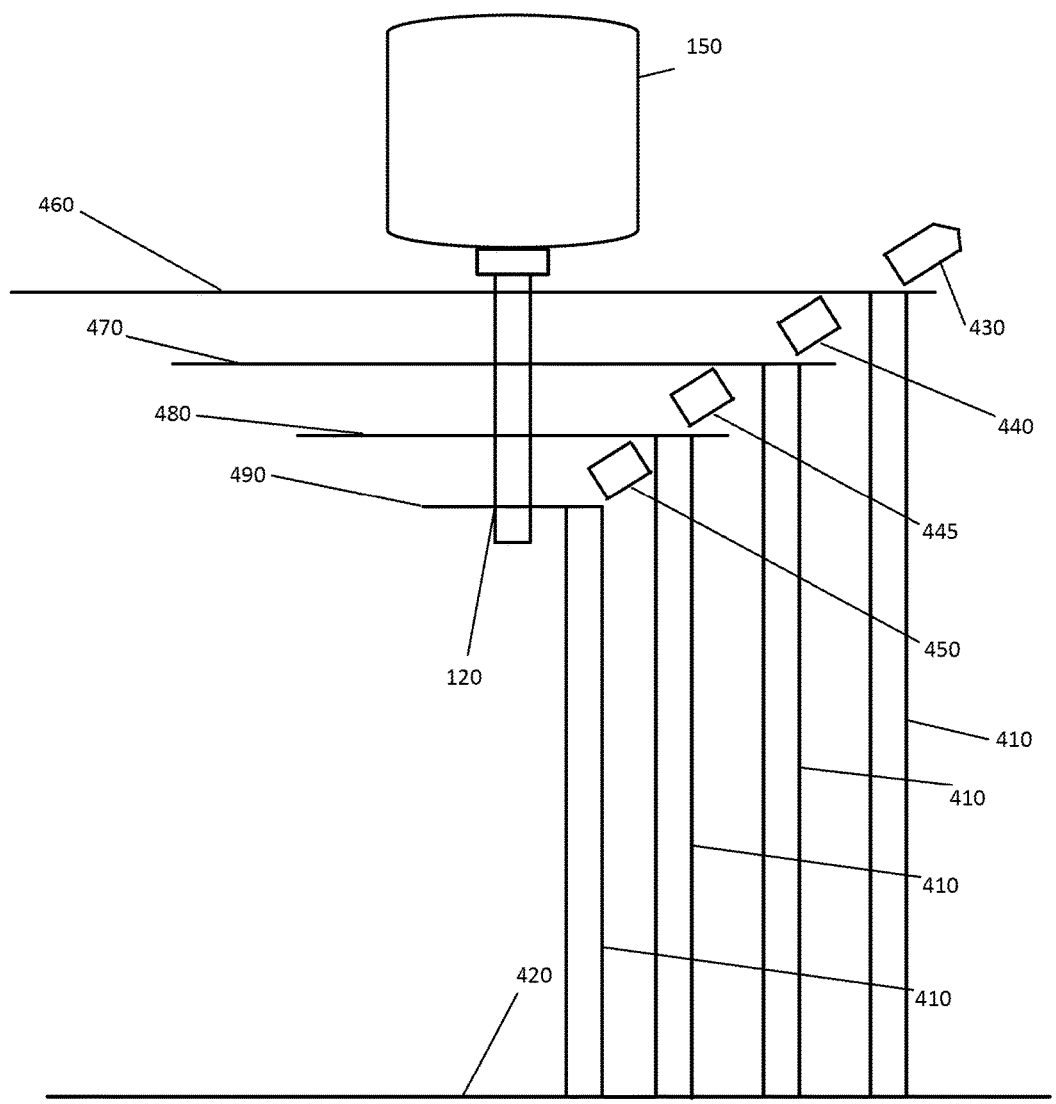
FIG. 4 Is a sketch of the device cutting consistent length pieces from stalks of grass.

FIG. 4 is a sketch showing stalks of grass 410 rooted in a growing medium 420 being cut into uniform length confetti like pieces 430, 440, 450, 455 by the rotating cutting cords 460, 470, 480 and 490, mounted on a drive shaft 120 with a power means 150.

Figure 5:
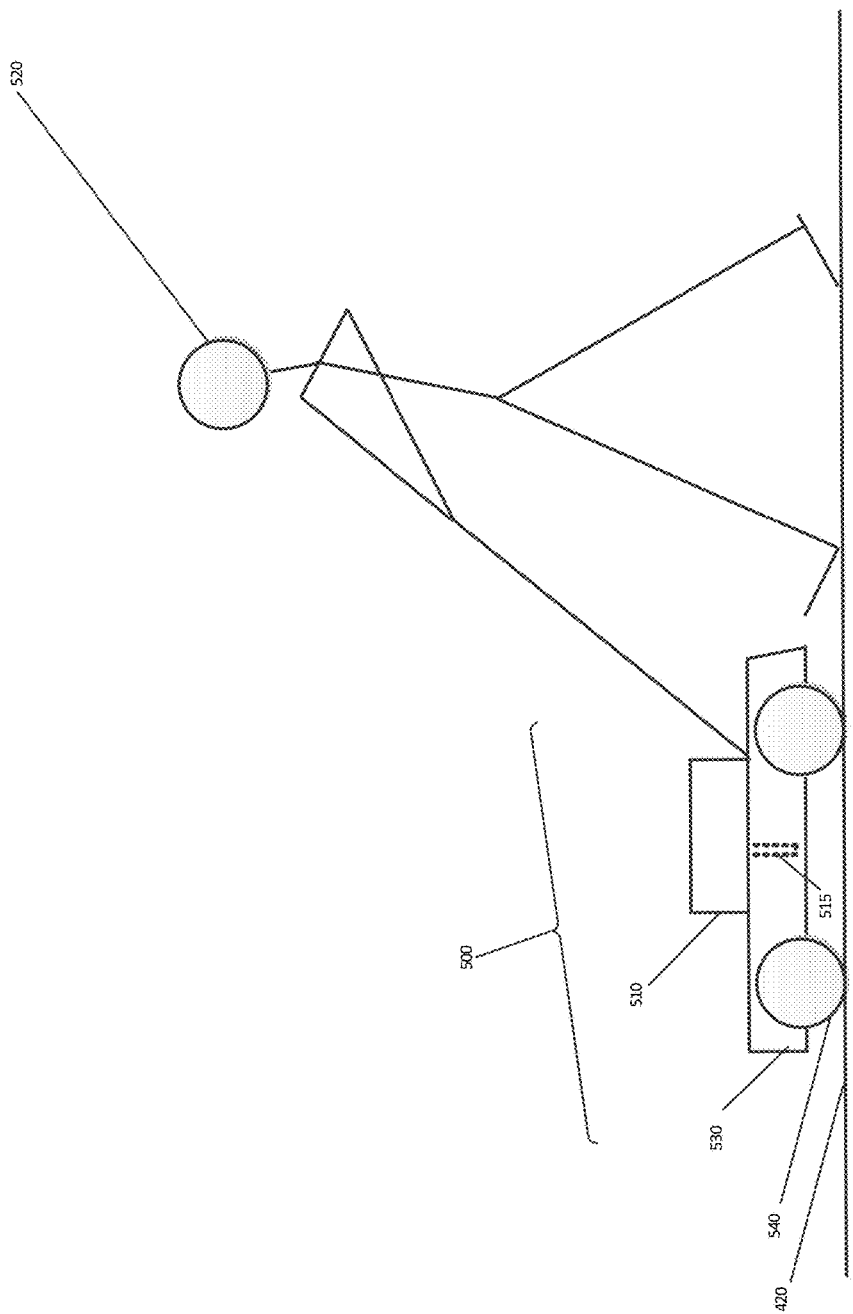
FIG. 5 is a sketch of a mowing machine being pushed or guided by a human.

FIG. 5 is a sketch of a mowing machine 500 which consists of a manual lawn mower 510 with a powered vertical drive shaft 515 being pushed by a human 520. The mowing machine may include self propelled features. The wheels 540 supports the housing 530. The wheels are typically adjustable in the vertical direction to change the height of the cutting cords.

Figure 6:
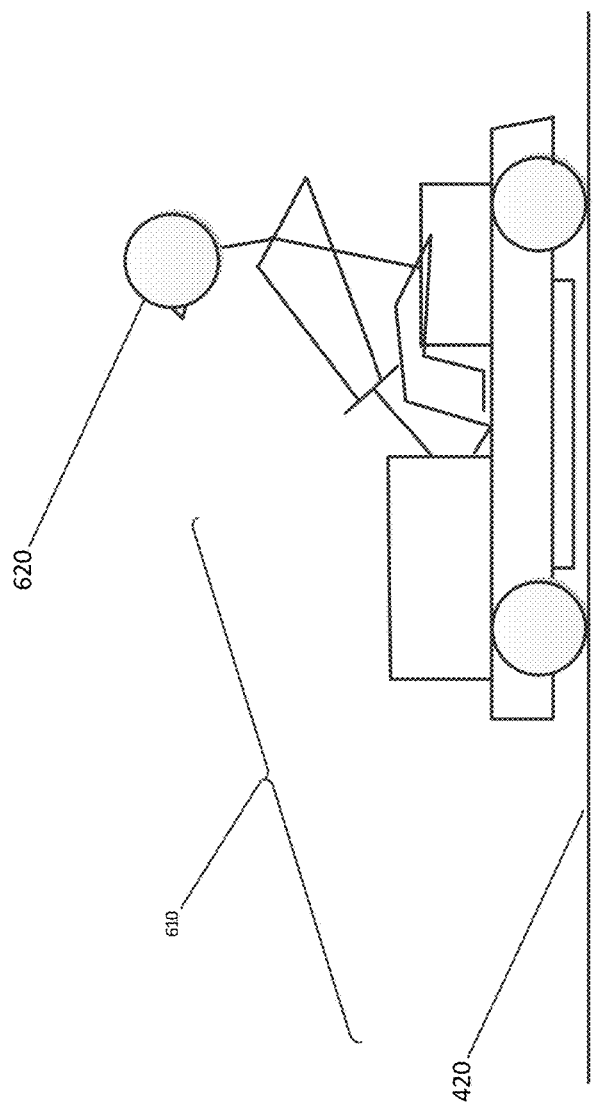
FIG. 6 is a sketch of a mowing machine which consists of a riding lawn mower being driven by a human.

FIG. 6 is a sketch of a mowing machine which consists of a riding lawn mower 610 being driven by a human 620 on the growing medium 420.

Figure 7:
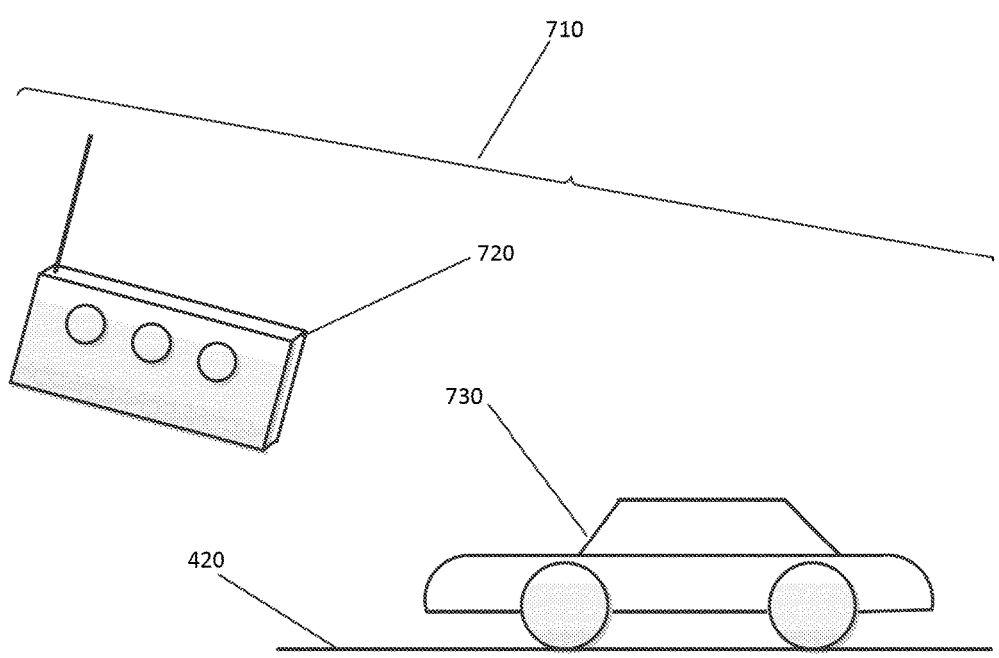
FIG. 7 is a sketch of a mowing machine which consists of a robotic lawn mower being controlled by a transmitter.

FIG. 7 is a sketch of a robotic lawn mower 730 being controlled remotely by a transmitter 720 forming a robotic lawn mowing system 710.

Figure 8A:
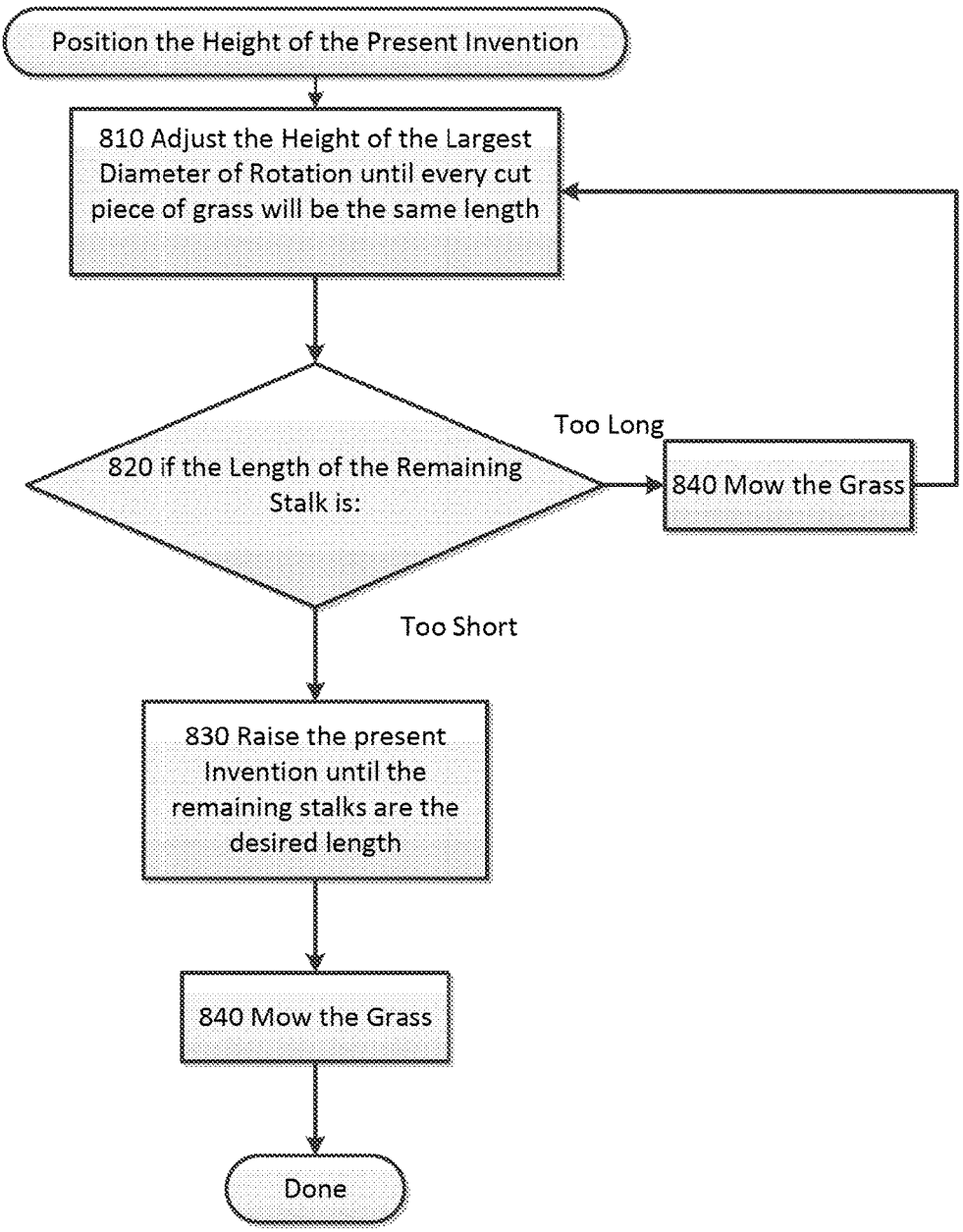
FIG. 8A is a flow chart of the process of positioning the height of the device from the growing medium.

FIG. 8A is a logic flow chart of the process of positioning the height of the present invention. The first adjustment 810 is made relative to the top of the longest grass stalks to be cut. If 820 the length of the remaining stalk is too short then 830 adjust the height of the cords upward until the remaining stalk is at the desired length. Then 840 mow the grass. Otherwise, if the length of the remaining stalk is too long. The present invention is typically raised by adjusting the height of the vertically adjustable wheels on the mowing machine. A second method of controlling the range of pieces cut is to add additional hubs and cutting cords.

Figure 8B:
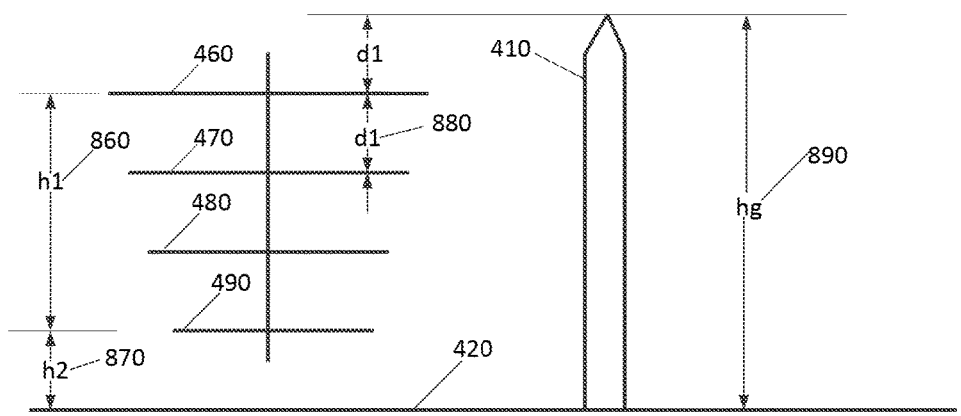
FIG. 8B shows the calculation of the distance to adjust the device from the growing medium.

FIG. 8B shows the calculation of the distance, "d1 880", to adjust the largest diameter of rotation in the present invention from the top of the grass stem at height hg where hg=the original length of the grass stalk, h1 860=the distance from the largest diameter of rotation the smallest diameter of rotation and d1 880=the distance between each diameter of rotation and the length of the top piece of grass sliced off.

Figure 9A:
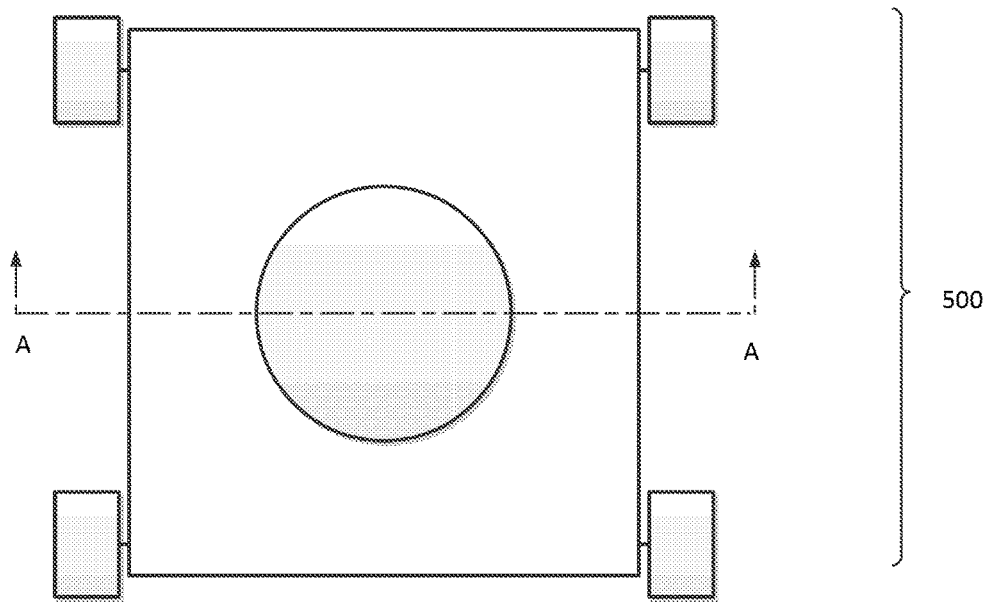
FIG. 9A is a sketch of the top view of a mowing machine housing.

FIG. 9A is a sketch of the top view of a mowing machine 500.

Figure 9B:
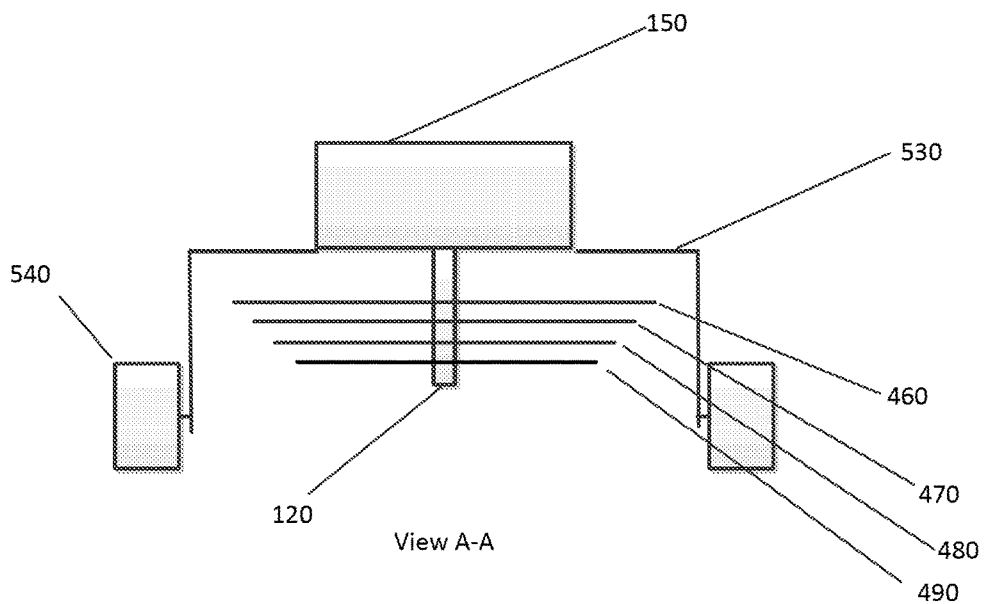
FIG. 9B is a sketch of a cut-a-way view of the mowing machine housing showing the four (as an example) cutting cords in progressively decreasing diameters of rotation attached to the vertical drive shaft.

FIG. 9B shows a cut-a-way view of the mowing machine which consists of a housing 530, a power means 150, a vertical drive shaft 120, heels 540, cutting cords, 470, 480 and 490).

Figure 11A:
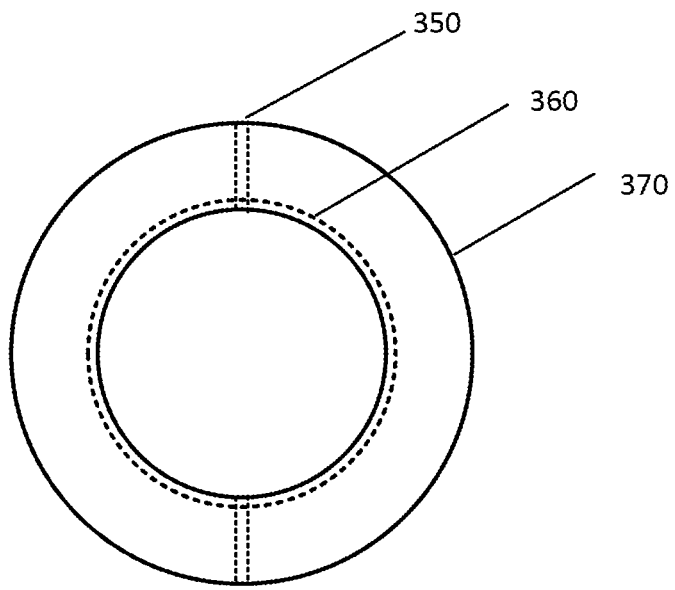
FIG. 11A is a top view of a hub showing the hole and the groove through which the cutting cord is inserted.

FIG. 11A is a top view of a hub 370 showing the hole 350 and the groove 360 through which the cutting cord is inserted.

Figure 11B:
FIG. 11B is a side view of a hub showing the hole and the groove through which the cutting cord is inserted.

FIG. 11B is a side view of a hub showing the hole and the groove through which the cutting cord is inserted.

The benefits of this, non-obvious, design (at least four progressively decreasing circles of rotation) becomes apparent when the present invention is moved forward on a growing medium 420 (i.e. in a mowing machine) through a field of grass or other vegetation.

The longest cutting cord 460 will slice off the top piece of the stalks 430 of grass while the remaining uncut portion 410 will pass under the cutting cord 460. The remaining uncut portion of the stalks will then have their new top piece 440 sliced off as the mowing machine moves forward. This process continues until all the cords have sliced the remaining stalks into consistently small uniform, confetti like, pieces 430, 440, 450 and 455. The length of these pieces is controlled by the thickness of the hubs and any optional spacers and therefore the distance between the cutting cords-on adjacent hubs.

The present invention achieves the goal of cutting and mulching grass, or other vegetation, into consistently small uniform, confetti like, pieces that will fall between the remaining uncut portion of the grass blades and help retain moisture and retard weed growth. Another benefit is to eliminate the need of disposing of the cut grass pieces.

The current state of the art of cutting and mulching grass is to use a single plane of rotation to cut a large top section from the grass stalk and then cause it to randomly tumble around in the cutting chamber in which the cutting blades or another blade is rotating. The assumption, or desire, is that the large cut stalks will then be cut into consistently small uniform, confetti like, pieces. Unfortunately the random process will result in random length cut pieces, some still to large to fall between the blades of uncut grass.

Therefore the design of the present invention removes the randomness from the cutting and mulching process by causing the cut grass to be of consistently small uniform, confetti like, pieces with the above mentioned benefits. The present invention, with four or more cutting cords will enable an operator to cut and mulch an overgrown lawn in one pass, which was previously not possible with only two or three cutting planes of rotation.

After the device is assembled, it is then slipped over the vertical drive shaft 120, with the tube end having the hub and cutting cords with the largest diameter of rotation going on the drive shaft first closest to the power means. The device is attached by one of the possible tube fastening means. Some of the possible tube fastening means are:
  a. a screw nut to tighten the device on the drive shaft with threads on the drive shaft end
  b. set screws to attach the tube to the drive shaft
  c. a cotter pin to attach the tube to the drive shaft
  d. a flat surface on the drive shaft with a corresponding flat surface in the tube further secured with set screws or cotter pins.
  e. keyways
  f. some combination of the above.

Some of the possible power means are:
  a. A fuel powered engine such as a gasoline engine, a propane engine, or any fuel capable of powering an engine,
  b. An electrically powered source such as a battery propelled motor or a plug-in electrical motor, It should be readily apparent to one skilled in the art that a few variations in the design of the device are possible without altering the concept of the present invention.

Figure 10A:
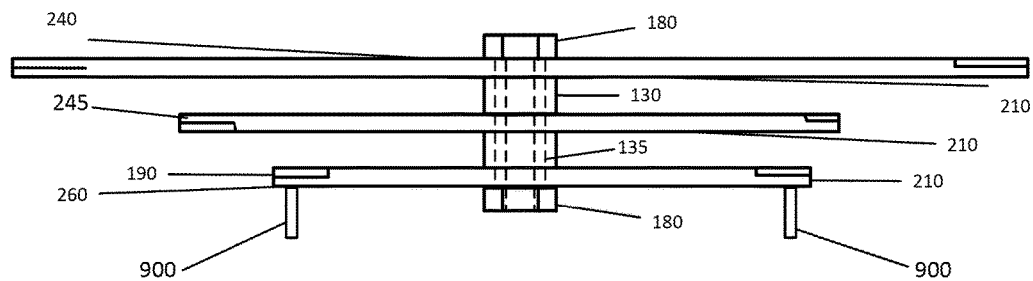
FIG. 10 is a sketch of the second embodiment with rake tongs attached to the bottom outside surface of the smallest blade holder to stir up debris, such as leaves, for the cutting blades to mulch.
Figure 10B:
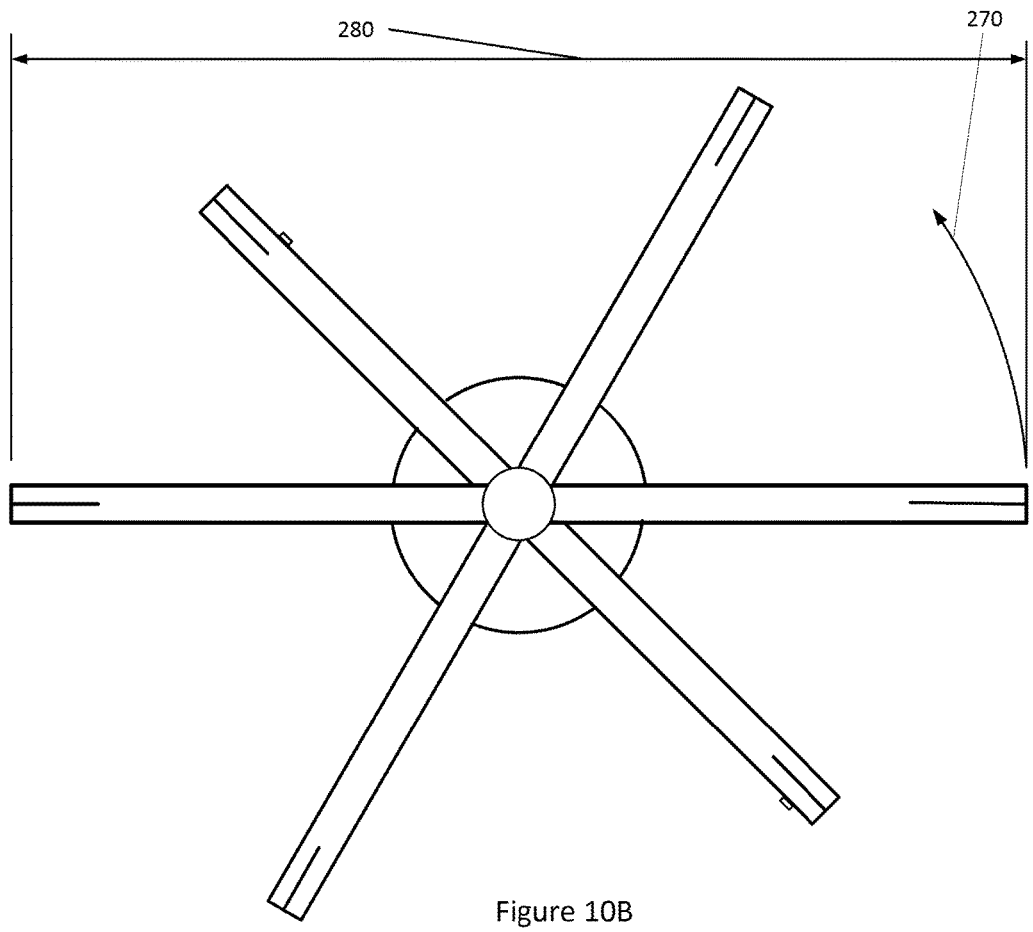

FIG. 10 includes optional Rake Tongs 900. The rake tongs can be attached to the bottom outside surface of the smallest blade holder to stir up debris, such as leaves, for the cutting blades to mulch.

Operation of the Present Invention

The operation of the present invention can be thought of in two processes, assembly and operation. The description varies based on whether the device is manufactured as individual components (Case 1) of if they are manufactured together in one unit (case 2). The assembly process for case 1 may be described as:

Case 1: The cutting blades are attached to the BH. The BH are then placed on the tube (largest first and progressively shorter next) and then secured with the screw nuts on each end of the tube as an example of the first fastening means. The assembled unit is then secured to the drive shaft with the second fastening means with the largest blade holders and cutting blades closest to the power means.

Case 1 & 2: The manufactured unit is secured to the drive shaft with the second fastening means with the largest blade holders and cutting blades closest to the power means.

A number of hubs 350 (four will be used for example) are chosen to assemble the device.

Cutting cords of decreasing length are then inserted through the hole 350 in each hub. The center portion of the cutting cord is pressed into the groove 360 on the bottom surface. The four hubs are then stacked on the tube 380 with the longest cutting cord closest to the hub flange 385. A wire nut 390 is then screwed onto the distal end of the tube on the mating threads on the tube. This compresses the hubs and locks the cutting cords in the hubs. The tube, hubs and cutting cords assembly is then slipped over the vertical drive shaft 120 with the hub flange closest to the power means. The tube is then securely attached to the drive shaft with the tube fastening means. The grass cutting and mulching device is now attached to the mowing machine completing the assembly process.

The operation process may then be described as follows:

After the present invention is securely attached to the drive shaft by the tube fastening means, the next step is to position the height of the present invention from the soil (as described in FIGS. 8A and 8B). The height adjustment would typically be done by adjusting the wheels on the mowing machine until the present invention is at the desired height. The desired height is a function of the length of the uncut grass stalks.

The first adjustment 810 is made relative to the top of the longest grass stalks to be cut. If 820 the length of the remaining stalk is too long then 840 mow the grass in pass number one (a second pass will then be needed). Otherwise if the length of the remaining stalk is too short then 830 raise the present invention until the remaining stalks are the desired length and then 840 mow the grass. If 850 the lengths of the remaining stalks of grass are too long then go to 810 (to do a second pass) otherwise the process is complete.

Alternatively, if it is desirable to complete the mowing of very tall grass in one pass then additional hubs and cutting cords (i.e. 5 or 6) in progressively shorter diameters of rotation may be added to the drive shaft until the top slice is the same as the interim slices of grass and the remaining stalks of grass are at the desired length.

Another approach to adjusting the height of the present invention is seen in FIG. 8B. If the grass 410 is "hg" units long 890, the distance between the largest BH and the smallest BH is h1 units 860, the distance between each diameter of rotation is d1 units 880, and h2 units 870 is the distance from the smallest diameter of rotation to the growing medium 895, then the distance to adjust the smallest diameter of rotation from the growing medium h2 870 is calculated by: h2=hg−h1−d1. Since we know hg, h1 and d1 we can easily calculate h2 which is the distance from the ground to the smallest diameter of rotation and adjust the wheels accordingly.

Note: if the grass stalk lengths "hg" are greater than h2+h1+d1 then either multiple mowing passes will be required or one must add additional hubs and cutting cords to the device.

During the season that leaves fall on the lawn, the optional Rake Tongs can be attached to the bottom outside surface of the smallest blade holder to stir up debris, such as leaves, for the cutting blades to mulch.

I claim:

1. A grass cutting and mulching device for cutting and mulching grass and other vegetation into cut pieces of a predetermined approximate length, the device for use with a mowing machine, the mowing machine having a vertical drive shaft, the mowing machine having a power means for rotating the drive shaft, the device designed and constructed to be securely attached to the vertical drive shaft, the device comprising:
    a) a tube, the tube having a length, the tube having a proximal end, the tube having a flange on the proximal end of the tube, the tube having a distal end, the tube having threads on the outside diameter of the distal end of the tube, the tube so constructed as to be removably attached to the vertical drive shaft by a tube fastening means,
    b) a plurality of at least four hubs, the hubs having a donut like circular shape with a donut hole like center opening, the center opening having a diameter that will cause the center opening to fit tightly around the length of the tube, the hubs having a thickness, the thickness measured along the length of the tube when the hubs are stacked on the tube, the hubs having a bottom surface, the hubs having a groove on the bottom surface of the tube along the center opening, the hubs having a hole through the hub, the hole parallel to a diameter of the hub, the hole at a position on the thickness of the hub that causes the hole to intersect with the groove at two locations, the hubs for stacking onto the tube,
    c) a plurality of at least four cutting cords, the number of cutting cords equal to the number of hubs,
    wherein each cutting cord is removably inserted into a respective hub through a respective hole on one side of the hub, and each cutting cord is pressed into the groove around the inside diameter of the hub, and inserted into the hole on the opposite side of the hub, wherein the respective cutting cord in each respective hub progressively decreases in length as the distance of the respective hub from the flange increases, such that the decreasing cutting cord lengths cause a locus of the rotating hubs and cutting cords to form circular planes of rotation, the circular planes of rotation having progressively decreasing diameters as the distance of the respective hub from the flange increases,
    d) a screw nut, the screw nut having threads that are designed to mate with the threads on the distal end of the outside diameter of the tube, the screw nut for compressing the stacked hubs against the flange thus locking the cutting cords,
    whereby the assembly of cutting cords and hubs on the tube compressed by the screw nut form the grass cutting and mulching device, and whereby the grass mulching device is attached to the vertical drive shaft by a tube fastening means, and whereby the vertical drive shaft is caused to rotate by the power means, and whereby the grass cutting and mulching device is caused to rotate by the rotating drive shaft, and whereby the grass cutting and mulching device progressively cuts the top pieces from each stalk of grass into cut pieces of the predetermined approximate length when the mowing machine is moved over the grass therein causing the cut pieces to fall between the remaining stalks of grass.

2. The grass cutting and mulching device, of claim 1, wherein the power means is selected from a group consisting of fuel powered and electrical powered.

3. A grass cutting and mulching method for cutting and mulching grass and other vegetation into cut pieces of a predetermined approximate length, the method for use with a mowing machine, the mowing machine having a vertical drive shaft, the mowing machine having a power means for rotating the drive shaft, the mowing machine having a grass cutting and mowing device, the grass cutting and mowing device designed and constructed to be securely attached to the vertical drive shaft, the method comprising:
    a) providing a tube, the tube having a length, the tube having a proximal end, the tube having a flange on the proximal end of the tube, the tube having a distal end, the tube having threads on the outside diameter of the distal end of the tube, the tube so constructed as to be removably attached to the vertical drive shaft by a tube fastening means,
    b) providing a plurality of at least four hubs, the hubs having a donut like circular shape with a donut hole like center opening, the center opening having a diameter that will cause the center opening to fit tightly around the length of the tube, the hubs having a thickness, the thickness measured along the length of the tube when the hubs are stacked on the tube, the hubs having a bottom surface, the hubs having a groove on the bottom surface of the tube along the center opening, the hubs having a hole through the hub, the hole parallel to a diameter of the hub, the hole at a position on the thickness of the hub that causes the hole to intersect with the groove at two locations, the hubs for stacking onto the tube, c) providing a plurality of at least four cutting cords, the number of cutting cords equal to the number of hubs, wherein each cutting cord is removably inserted into a respective hub through a respective hole on one side of the hub, and each cutting cord is pressed into the groove around the inside diameter of the hub, and inserted into the hole on the opposite side of the hub, wherein the respective cutting cord in each respective hub progressively decreases in length as the distance of the respective hub from the flange increases, such that the decreasing cutting cord lengths cause a locus of the rotating hubs and cutting cords to form circular planes of rotation, the circular planes of rotation having progressively decreasing diameters as the distance of the respective hub from the flange increases, d) providing a screw nut, the screw nut having threads that are designed to mate with the threads on the distal end of the outside diameter of the tube, the screw nut for compressing the stacked hubs against the flange thus locking the cutting cords, whereby the assembly of cutting cords and hubs on the tube compressed by the screw nut form a grass cutting and mulching device within the grass cutting and mulching method, and whereby the grass mulching device is attached to the vertical drive shaft by the tube fastening means, and whereby the vertical drive shaft is caused to rotate by the power means, and whereby the grass cutting and mulching device is caused to rotate by the rotating drive shaft, and whereby the grass cutting and mulching method progressively cuts the top pieces from each stalk of grass into cut pieces of the predetermined approximate length when the mowing machine is moved over the grass, e) assembling the cutting cords on each hub by passing the cutting cord through the hole on one side of the hub and inserting the center portion of the cutting cord into one half the groove and inserting the cutting cord into the hole on the opposite side of the hub, the insertions done in a manner such that there is no slack in the cutting cord within the hub, and repeating for each of the plurality of the remaining hubs, f) stacking the plurality of hubs on the distal end of the tube with the longest inserted cutting cord closest to the flange and the remaining stacked hubs having cutting cords of progressively decreasing lengths, g) compressing the hubs together by tightening the screw nut on the distal end of the hub, thereby locking the cutting cords in place, whereby a grass cutting and mulching device is assembled, h) inserting the proximal end of the tube in the grass cutting and mulching device onto the vertical drive shaft, i) securing the tube in the grass cutting and mulching device to the vertical drive shaft with the tube fastening means, whereby the vertical drive shaft is caused to rotate by the power means, the grass cutting and mulching device is caused to rotate by the rotating drive shaft, whereby the grass cutting and mulching method sequentially cuts the top pieces from each stalk of vegetation into cut pieces of the predetermined approximate length when the mowing machine is moved over the ground thereby causing the cut pieces of vegetation to fall between the remaining stalks of grass.

4. The grass cutting and mulching method, of claim 3, wherein the power means is selected from a group consisting of fuel powered and electrical powered.

\* \* \* \* \*